US009418428B2

(12) United States Patent
Saito

(10) Patent No.: US 9,418,428 B2
(45) Date of Patent: Aug. 16, 2016

(54) POSITION MANAGEMENT DEVICE, POSITION MANAGEMENT SYSTEM, POSITION MANAGEMENT METHOD, AND POSITION MANAGEMENT PROGRAM

(71) Applicant: NEC Corporation, Minato-ku, Tokyo (JP)

(72) Inventor: Shigetsu Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/411,985

(22) PCT Filed: Jun. 28, 2013

(86) PCT No.: PCT/JP2013/004030
§ 371 (c)(1),
(2) Date: Dec. 30, 2014

(87) PCT Pub. No.: WO2014/006859
PCT Pub. Date: Jan. 9, 2014

(65) Prior Publication Data
US 2015/0161794 A1    Jun. 11, 2015

(30) Foreign Application Priority Data

Jul. 2, 2012    (JP) ................................. 2012-148404

(51) Int. Cl.
| | |
|---|---|
| *G06K 9/00* | (2006.01) |
| *G06T 7/00* | (2006.01) |
| *H04N 7/18* | (2006.01) |
| *G06T 7/20* | (2006.01) |

(52) U.S. Cl.
CPC ............... *G06T 7/0038* (2013.01); *G06T 7/004* (2013.01); *G06T 7/2093* (2013.01); *H04N 7/188* (2013.01); *G06T 2207/10016* (2013.01); *G06T 2207/10024* (2013.01); *G06T 2207/30232* (2013.01)

(58) Field of Classification Search
CPC ...... H04N 7/188; G06T 7/0038; G06T 7/004; G06T 2207/30232; G06T 7/2093; G06T 2207/10024; G06T 2207/10016

USPC ............................................................ 382/103
See application file for complete search history.

(56) References Cited

U.S. PATENT DOCUMENTS

| | | | | |
|---|---|---|---|---|
| 6,693,648 | B1 * | 2/2004 | Lyndon | .......................... 715/744 |
| 2005/0002455 | A1 * | 1/2005 | Lin et al. | ................... 375/240.16 |
| 2006/0093185 | A1 * | 5/2006 | Kato et al. | ..................... 382/103 |

FOREIGN PATENT DOCUMENTS

| | | |
|---|---|---|
| JP | 2004-103018 A | 4/2004 |
| JP | 2005-217786 A | 8/2005 |
| JP | 2010-206404 A | 9/2010 |
| JP | 2010-237971 A | 10/2010 |

OTHER PUBLICATIONS

International Search Report for PCT Application No. PCT/JP2013/004030, mailed on Aug. 27, 2013.

* cited by examiner

*Primary Examiner* — Gregory F Cunningham

(57) ABSTRACT

The position management device includes: a calculation unit that gives identification on an object being monitored to the object being monitored cyclically imaged, and calculates positional information of the object from an image of the object; a storage unit that associates the identification and an imaging time with the positional information, and stores these items; and a comparison unit that compares, with respect to the object, an absolute value of a difference between the positional information as of a current time and the positional information as of each of the imaging times one and two cycle(s) prior to the current time, as stored in the storage unit, with a predetermined reference value, and outputs the positional information as of the current time if the absolute value for at least one of the imaging times is less than the reference value.

7 Claims, 9 Drawing Sheets

Fig. 4

104 CALCULATED POSITION RESULT

| IMAGING DEVICE ID | OBJECT ID | COORDINATES A | TIME FOR COORDINATES A | COORDINATES B | TIME FOR COORDINATES B | COORDINATES C | TIME FOR COORDINATES C | ... |
|---|---|---|---|---|---|---|---|---|
| 001 | 01a | (x1,y1) | t | (x2,y2) | t-1 | (x3,y3) | t-2 | ... |
| 002 | 01a | (x1,y1) | t | (x2,y2) | t-1 | (x3',y3') | t-2 | ... |
| 003 | 01a | (x1',y1') | t | (x2',y2') | t-1 | (x3,y3) | t-2 | ... |
| 001 | 01b | (xa,ya) | t | (xb',yb') | t-1 | (xc,yc) | t-2 | ... |
| 002 | 01b | (xa,ya) | t | (xb,yb) | t-1 | (xc',yc') | t-2 | ... |
| 003 | 01b | (xa',ya') | t | (xb,yb) | t-1 | (xc,yc) | t-2 | ... |

Fig. 5

105 IDENTIFIED POSITION RESULT

| OBJECT ID | COORDINATES A | TIME FOR COORDINATES A | COORDINATES B | TIME FOR COORDINATES B | COORDINATES C | TIME FOR COORDINATES C | ... |
|---|---|---|---|---|---|---|---|
| 01a | (x4,y4) | t | (x5,y5) | t-1 | (x6,y6) | t-2 | ... |
| 01b | (xd,yd) | t | (xe,ye) | t-1 | (xf,yf) | t-2 | ... |

Fig. 6

106 DETERMINATION RESULT LIST

| SOURCE OF EXTRACTED DATA | | TIME | | IMAGING DEVICE 20-1 | IMAGING DEVICE 20-2 | IMAGING DEVICE 20-3 |
|---|---|---|---|---|---|---|
| IMAGING DEVICE | | t | EXTRACTED DATA | {001,01a,(x1,y1),t} | {002,01a,(x1,y1),t} | {003,01a,(x1',y1'),t} |
| CALCULATED POSITION RESULT 104 | | t-1 | EXTRACTED DATA | {001,01a,(x2,y2),t-1} | {002,01a,(x2,y2),t-1} | {003,01a,(x2',y2'),t-1} |
| | | | CALCULATED RESULT IN COMPARISON UNIT 101-i | |x1-x2|< α  |y1-y2|< β | |x1-x2|< α  |y1-y2|< β | |x1'-x2'|> α  |y1'-y2'|> β |
| | | | DETERMINATION RESULT | OK | OK | INAPPROPRIATE |
| | | t-2 | EXTRACTED DATA | {001,01a,(x3,y3),t-2} | {002,01a,(x3',y3'),t-2} | {003,01a,(x3,y3),t-2} |
| | | | CALCULATED RESULT IN COMPARISON UNIT 101-i | |x1-x3|< α  |y1-y3|< β | |x1-x3'|> α  |y1-y3'|< β | |x1'-x3|> α  |y1'-y3|> β |
| | | | DETERMINATION RESULT | OK | INAPPROPRIATE | INAPPROPRIATE |
| IDENTIFIED POSITION RESULT 105 | | t-1 | EXTRACTED DATA | {01a,(x5,y5),t-1} | | |
| | | | CALCULATED RESULT IN COMPARISON UNIT 101-i | |x1-x5|< α  |y1-y5|< β | |x1-x5|< α  |y1-y5|< β | |x1'-x5|> α  |y1'-y5|> β |
| | | | DETERMINATION RESULT | OK | OK | INAPPROPRIATE |
| | | t-2 | EXTRACTED DATA | {01a,(x6,y6),t-2} | | |
| | | | CALCULATED RESULT IN COMPARISON UNIT 101-i | |x1-x6|< α  |y1-y6|< β | |x1-x6|< α  |y1-y6|< β | |x1'-x6|> α  |y1'-y6|> β |
| | | | DETERMINATION RESULT | OK | OK | INAPPROPRIATE |

(NOTE) FORMAT OF DATA EXTRACTED IN IMAGING DEVICE AND CALCULATED POSITION RESULT 104:
[IMAGING DEVICE ID, OBJECT ID, CALCULATED OBJECT COORDINATES, IMAGING TIME]
FORMAT OF DATA EXTRACTED IN IDENTIFIED POSITION RESULT 105:
[OBJECT ID, CALCULATED OBJECT COORDINATES, IMAGING TIME]

POSITION MANAGEMENT DEVICE, POSITION MANAGEMENT SYSTEM, POSITION MANAGEMENT METHOD, AND POSITION MANAGEMENT PROGRAM

This application is a National Stage Entry of PCT/JP2013/004030 filed on Jun. 28, 2013, which claims priority from Japanese Patent Application 2012-148404 filed on Jul. 2, 2012, the contents of all of which are incorporated herein by reference, in their entirety.

TECHNICAL FIELD

The present invention relates to a position management device and the like which calculates positional information on an object being monitored from images taken by a monitoring camera.

BACKGROUND ART

A recent increased awareness of security and greater needs for IT (Information Technology) based on-site management have led to introduction of monitoring systems employing monitoring cameras into various places. These monitoring systems have a function to detect a position of an object being monitored by performing image analysis processing on images output by a monitoring camera and then utilizing the processing results.

As a technique related to positional detection of objects being monitored in such monitoring systems, PTL 1 discloses an apparatus which performs data processing on images taken by an infrared camera and a PTZ (Pan Tilt Zoom) camera which obtain moving images. This apparatus identifies a monitoring target, i.e. a person smoking while walking, then uses the PTZ camera to track the identified person who is smoking while walking.

In addition, PTL 2 discloses an apparatus which is capable of detecting the position of a person by precisely combining a plurality of sets of positional information on the person whose images have been taken by a plurality of monitoring cameras, even if these sets of positional information have a detection error.

In addition, PTL 3 discloses an apparatus which determines that an object i is identical to an object j if a difference between coordinates of a gravity center of the object i at a time k and coordinates of a gravity center of the object j at a time (k+1) is less than a predetermined value.

CITATION LIST

Patent Literature

[PTL 1]: Japanese Unexamined Patent Application Publication No. 2010-237971
[PTL 2]: Japanese Unexamined Patent Application Publication No. 2010-206404
[PTL 3]: Japanese Unexamined Patent Application Publication No. 2004-103018

SUMMARY OF INVENTION

Technical Problem

The above-described apparatus according to PTL 1 tracks the object being monitored on the basis of image data taken by one infrared camera and one PTZ camera. Accordingly, there is a problem in that it is possible to fail to detect an accurate position of the object being monitored if either camera produces an erroneous output.

In addition, the above-described apparatus according to PTL 2 calculates the position of an object being monitored using image data taken by a plurality of monitoring cameras for the same object. There is a problem in that accuracy can possibly be significantly decreased during combination of sets of positional information which are output by a plurality of the monitoring cameras if any monitoring camera produces the erroneous output.

A primary objective of the present invention is to provide a position management device, a position management system, a position management method, and a position management program which solve the problems described above.

Solution to Problem

A position management device relevant to the present patent application includes: a calculation unit for giving identification information on an object being monitored to the object being monitored cyclically imaged by an imaging device, and for calculating positional information of the object being monitored from an image of the imaged object being monitored; a storage unit for associating the identification information of the object being monitored and an imaging time with the positional information, and for storing the identification information, the imaging time and the positional information, which are associated with each other; and a comparison unit for comparing, with respect to the object being monitored, an absolute value of a difference between a value of the positional information as of a current time and a value of the positional information as of each of the imaging times one cycle and two cycles prior to the current time, as stored in the storage unit, with a predetermined reference value, and for outputting the positional information as of the current time even if the absolute value of the difference for the imaging time one cycle prior to the current time is equal to or greater than the reference value, and if the absolute value of the difference for the imaging time two cycles prior to the current time is less than the reference value.

In another aspect for achieving the above-mentioned objective, a position management method of the present patent application includes: by an information processing apparatus, giving identification information on an object being monitored to the object being monitored cyclically imaged by an imaging device, and calculating positional information of the object being monitored from an image of the imaged object being monitored; by an information processing apparatus, associating the identification information of the object being monitored and an imaging time with the positional information, and storing the identification information, the imaging time and the positional information in a storage area; and by the information processing apparatus, comparing, with respect to the object being monitored, an absolute value of a difference between a value of the positional information as of a current time and a value of the positional information as of each of the imaging times one cycle and two cycles prior to the current time, as stored in the storage area, with a predetermined reference value, and outputting the positional information as of the current time even if the absolute value of the difference for the imaging time one cycle prior to the current time is equal to or greater than the reference value, and if the absolute value of the difference corresponding to the imaging time two cycles prior to the current time is less than the reference value.

In a further aspect for achieving the above-mentioned objective, a position management program relevant to the present patent application causes a computer to execute: a calculation processing of giving identification information on an object being monitored to the object being monitored cyclically imaged by an imaging device, and calculating positional information of the object being monitored from an image of the imaged object being monitored; a storage processing of associating the identification information of the object being monitored and an imaging time with the positional information, and storing the identification information, the imaging time and the positional information, which are associated with each other, in a storage area; and a comparison processing of, with respect to the object being monitored, comparing an absolute value of a difference between a value of the positional information as of a current time and a value of the positional information as of each of the imaging times one cycle and two cycles prior to the current time, as stored in the storage area, with a predetermined reference value, and outputting the positional information as of the current time even if the absolute value of the difference for the imaging time one cycle prior to the current time is equal to or greater than the reference value, and if the absolute value of the difference for the imaging time two cycles prior to the current time is less than the reference value.

Furthermore, in another aspect of the present invention, such position management program (a computer program) can also be implemented by a computer-readable nonvolatile storage medium.

Advantageous Effects of Invention

The present invention makes it possible to calculate, with high precision, positional information on an object being monitored from an image taken by a monitoring camera.

BRIEF DESCRIPTION OF DRAWINGS

FIG. 4 is a chart describing an example composition of a calculated position result according to the first exemplary embodiment of the present invention;

FIG. 5 is a chart describing an example composition of an identified position result according to the first exemplary embodiment of the present invention;

FIG. 6 is a chart describing an example result list of determination in the comparison unit according to the first exemplary embodiment of the present invention;

DESCRIPTION OF EMBODIMENTS

A first exemplary embodiment of the present invention will now be explained in detail with reference to the drawings.

First Exemplary Embodiment

Figure 1:
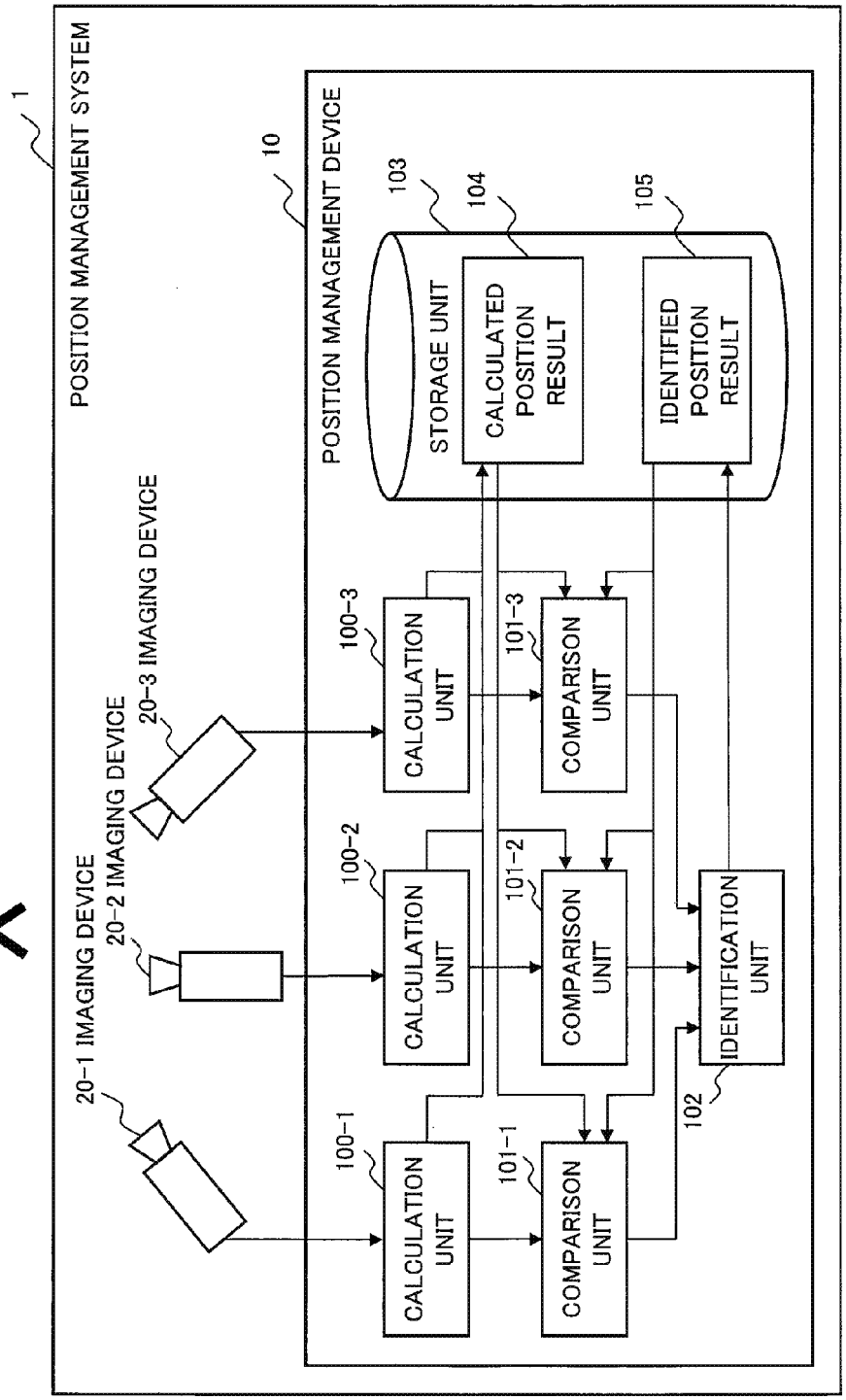
FIG. 1 is a block diagram illustrating a configuration of a position management system according to a first exemplary embodiment of the present invention.

FIG. 1 is a block diagram illustrating a configuration of a position management system relevant to the first exemplary embodiment of the present invention.

A position management system 1 according to this exemplary embodiment includes a position management device 10 and three imaging devices 20-1 to 20-3. The imaging devices 20-1 to 20-3 are devices which take images; typical examples include color cameras, black-and-white cameras, thermal cameras, and the like. The imaging devices 20-1 to 20-3 take images in an image format generally used for image analysis processing such as BMP (Bit MaP) or JPEG (Joint Photographic Experts Group). Each of the imaging devices 20-1 to 20-3 takes an image of an object being monitored 2 from its own direction cyclically, for example at intervals of one second, and transmits data of the taken image to the position management device 10. Note that the object being monitored 2 in this exemplary embodiment is a person, for example.

The position management device 10 includes calculation units 100-1 to 100-3, comparison units 101-1 to 101-3, an identification unit 102, and a storage unit 103.

The calculation units 100-1 to 100-3 sequentially give identification information for identifying the object being monitored 2 recorded in the image data that has been received from the respective imaging devices 20-1 to 20-3. The calculation units 100-1 to 100-3 sequentially calculate the positional information of the object being monitored 2 for every imaging time based on the image data received from the respective imaging devices 20-1 to 20-3, and then sequentially transmit the calculated results to the respective comparison units 101-1 to 101-3. The calculation units 100-1 to 100-3 also transmit the above-described calculated results to the storage unit 103.

Note that the calculation units 100-1 to 100-3 and the comparison units 101-1 to 101-3 may be combined into one calculation unit and one comparison unit, respectively. In this case, each of the combined calculation unit and comparison unit performs the above-described processing on three sets of image data received from the imaging devices 20-1 to 20-3.

The storage unit 103 associates identification information for identifying the imaging devices 20-1 to 20-3, identification information for identifying the object being monitored 2 and an imaging time with the positional information of the object being monitored 2 received from the calculation units 100-1 to 100-3, and stores these associated items as a calculated position result 104.

FIG. 4 represents an example composition of the calculated position result 104. The table illustrated in FIG. 4 represents that an imaging device ID, an object ID, a time, and coordinates of the object imaged by such imaging device at each time are associated with one another. The imaging device ID is identification information for identifying the imaging devices 20-1 to 20-3, and the imaging device IDs corresponding to the imaging devices 20-1 to 20-3 are 001 to 003, respectively.

The object ID is identification information given by the calculation units 100-1 to 100-3 to the object being monitored 2, and the object ID for the object being monitored 2 is 01a. Note that an object ID, "01b", is given by the calculation units 100-1 to 100-3 to another object being monitored which is not illustrated in FIG. 1 and is different from the object being monitored 2.

The current time is t. The positional information of the object being monitored 2, calculated by the calculation units 100-1 to 100-3 based on image data for the object being monitored 2 imaged by the imaging devices 20-1 to 20-3 at a time t, is coordinates A. In this exemplary embodiment, an imaging area taken by the imaging devices 20-1 to 20-3 is regarded as a virtual space, and the positional information of the object being monitored 2 is represented by two-dimensional coordinates on the virtual space, namely an x coordinate on the horizontal axis and a y coordinate on the vertical axis. The coordinates A calculated from the image data taken by the imaging devices 20-1 to 20-3 are (x1, y1), (x1, y1), and (x1', y1'), respectively. The coordinates A (x1', y1') calculated from the image data taken by the imaging device 20-3 is different from the coordinates A (x1, y1) calculated from the image data taken by the imaging devices 20-1 and 20-2. This is because the imaging device 20-3 produced an erroneous output of image data due to some trouble such as a disturbed image at the time t.

As illustrated in FIG. 4, the calculated position result 104 contains the above-described data recorded at cyclical imaging times. The positional information of the object being monitored 2, calculated by the calculation units 100-1 to 100-3 based on image data taken by the imaging devices 20-1 to 20-3 at a time (t−1) which is one cycle prior to the time t, for example one second prior to the time t, is coordinates B. Similarly, the positional information of the object being monitored 2, calculated by the calculation units 100-1 to 100-3 based on image data taken by the imaging devices 20-1 to 20-3 at a time (t−2) which is two cycles prior to the time t, for example two seconds prior to the time t, is coordinates C.

The comparison units 101-1 to 101-3 sequentially receive the positional information of the object being monitored 2 in relation to the respective imaging devices 20-1 to 20-3 as of the time t, and then determine whether or not the received positional information is valid. Details of validity determination operations performed by the comparison units 101-1 to 103-3 will be described below.

As long as any one of the comparison units 101-1 to 101-3 determines that the positional information on the received object being monitored 2 as of the time t is valid, it transmits the information to the identification unit 102. For example, suppose that the comparison unit 101-3 has determined that the positional information calculated from the image data taken by the imaging device 20-3 is invalid. In this case, the identification unit 102 will only receive, from the comparison units 101-1 to 101-2, the positional information calculated from the image data taken by the imaging devices 20-1 to 20-2.

The identification unit 102 identifies the position of the object being monitored 2 as of the time t based on sets of the positional information received from the comparison units 101-1 to 101-3. The identification unit 102 identifies the position by, for example, calculating the average of a plurality of positional information values. Another method for the identification may be determining a value based on a majority rule assuming that positional information values within a certain range of error are regarded as the same value.

The identification unit 102 transmits an identified result with respect to the position of the object being monitored 2 to the storage unit 103. The storage unit 103 associates identification information for identifying the object being monitored 2 and an imaging time with the identified result of the position of the object being monitored 2 received from the identification unit 102, and stores these associated items as an identified position result 105.

FIG. 5 represents an example composition of the identified position result 105. The table illustrated in FIG. 5 represents that an object ID, a time, and object coordinates identified by the identification unit 102 as of each time are associated with one another. The coordinates A, B, and C with respect to the object being monitored 2 whose object ID is 01a, identified for the times t, (t−1), and (t−2) are (x4, y4), (x5, y5), and (x6, y6), respectively.

Now details are described about validity determination operations performed by the comparison unit 101-$i$ ($i$=1, 2, 3) on positional information of the object being monitored 2.

The comparison unit 101-$i$ receives from the calculation unit 100-$i$ the positional information of the object being monitored 2 that has been calculated from the image data taken by the imaging device 20-$i$ at a time t. In this case, the comparison unit 101-$i$ extracts the positional information of the object being monitored 2 relevant to the imaging device 20-$i$ as of times (t−1) and (t−2) from the calculated position result 104 and from the identified position result 105. The comparison unit 101-$i$ calculates the absolute value of the difference between the value as of the time t and the value as of each of the times (t−1) and (t−2) with respect to the positional information of the object being monitored 2 relevant to the imaging device 20-$i$.

The comparison unit 101-$i$ compares the above-described absolute value with a predetermined reference value. In this exemplary embodiment, the administrator of the position management system 1 has set reference values in the comparison unit 101-$i$ as a reference value $\alpha$ for the x coordinate and a reference value $\beta$ for the y coordinate. The reference values $\alpha$ and $\beta$ are calculated by the administrator of the position management system 1 from the moving speed of a person monitored by the position management system 1 based on a distance by which a person possibly moves in a time equivalent to one cycle. In this exemplary embodiment, the comparison unit 101-$i$ calculates the absolute value of the difference between the value as of the time t and the value as of each of the times (t−1) and (t−2) with respect the positional information of the object being monitored 2, and makes a comparison with the reference values $\alpha$ and $\beta$. Accordingly, the reference values $\alpha$ and $\beta$ represent a distance by which a person possibly moves in a time equivalent to two cycles, and are already set by the administrator of the position management system 1. For example, if one cycle time is one second, the reference values $\alpha$ and $\beta$ would be about a few meters.

Note that it is possible to make the criteria stricter or more relaxed by changing the reference values $\alpha$ and $\beta$. Alternatively, instead of using reference values specified for x and y coordinates, the comparison unit 101-$i$ may use a single reference value which represents a moving distance of the object being monitored 2 calculated from the values representing the coordinates of the object being monitored 2 before and after it moves.

During comparison of the above-described absolute value of the difference with the reference values $\alpha$ and $\beta$, the comparison unit 101-$i$ determines that the coordinates of the object being monitored 2 have no problem for the moment if the absolute value of the difference for the x coordinate is less than $\alpha$ and the absolute value of the difference for the y coordinate is less than $\beta$.

FIG. 6 represents an example result list of positional information validity determination performed by the comparison unit 101-$i$ with respect to the imaging device 20-$i$. The table illustrated in FIG. 6 represents that a source of extracted data, a time, extracted data corresponding to the time and each imaging device, a result of calculation in the comparison unit 101, and a determination result are associated with one another. In the determination result list 106 illustrated in FIG. 6, the format of data extracted from an imaging device and a calculated position result 104 is {imaging device ID, object ID, calculated object coordinates, imaging time}. Thus, for example, the data {001,01a,(x1,y1),t} represents that "the coordinates of the object being monitored 2 whose object ID is 01a as of a time t calculated from the image data taken by an imaging device 20-1 whose imaging device ID is 001 are (x1, y1)."

As illustrated in FIG. 6, the moving distance of the x coordinate |x1−x2| and the moving distance of the y coordinate |y1−y2| between times (t−1) and t with respect to the object being monitored 2, calculated from the images taken by the imaging device 20-1 are less than reference values α and β, respectively. Thus, the comparison unit 101-1 determines that the coordinates of the object being monitored 2 as of the time t calculated from the image taken by the imaging device 20-1 are OK. Likewise, the comparison unit 101-2 determines that the coordinates of the object being monitored 2 as of the time t calculated from the image taken by the imaging device 20-2 are also OK.

The moving distance of the x coordinate |x1′−x2′| and the moving distance of the y coordinate |y1′−y2′| between the times (t−1) and t with respect to the object being monitored 2, calculated from the images taken by the imaging device 20-3 are greater than the reference values α and β, respectively. Thus, the comparison unit 101-3 determines that the coordinates of the object being monitored 2 as of the time t calculated from the image taken by the imaging device 20-3 are inappropriate.

Likewise, on the data extracted from an identified position result 105, the comparison unit 101-$i$ calculates absolute values of differences from the x and y coordinates as of the time t extracted from the imaging device 20-$i$, and then makes comparisons with reference values α and β.

In FIG. 6, the format of data extracted from an identified position result 105 is {object ID, calculated object coordinates, imaging time}. Thus, for example, the data {01a,(x5, y5),(t−1)} represents that "the coordinates of an object being monitored 2 whose object ID is 01a as of a time (t−1) identified by the identification unit 102 are (x5, y5)."

As illustrated in FIG. 6, the moving distance of the x coordinate |x1−x5| and the moving distance of the y coordinate |y1−y5| between times (t−1) and t with respect to the object being monitored 2, calculated from the images taken by the imaging device 20-1 are less than reference values α and β, respectively. Thus, the comparison unit 101-1 determines that the coordinates of the object being monitored 2 as of the time t calculated from the image taken by the imaging device 20-1 are OK. Likewise, the comparison unit 101-2 determines that the coordinates of the object being monitored 2 as of the time t calculated from the image taken by the imaging device 20-2 are also OK.

The moving distance of the x coordinate |x1′−x5| and the moving distance of the y coordinate |y1′−y5| between the times (t−1) and t with respect to the object being monitored 2, calculated from the images taken by the imaging device 20-3 are greater than the reference values α and β, respectively. Thus, the comparison unit 101-3 determines that the coordinates of the object being monitored 2 as of the time t calculated from the image taken by the imaging device 20-3 are inappropriate.

The comparison unit 101-$i$, based on the above-described individual determination results, determines whether the positional information of the object being monitored 2 with respect to the imaging device 20-$i$ as of the time t is finally valid or not following a predetermined determination flow. The determination flow will be described below where an operation flow according to this exemplary embodiment is explained.

Figure 2:
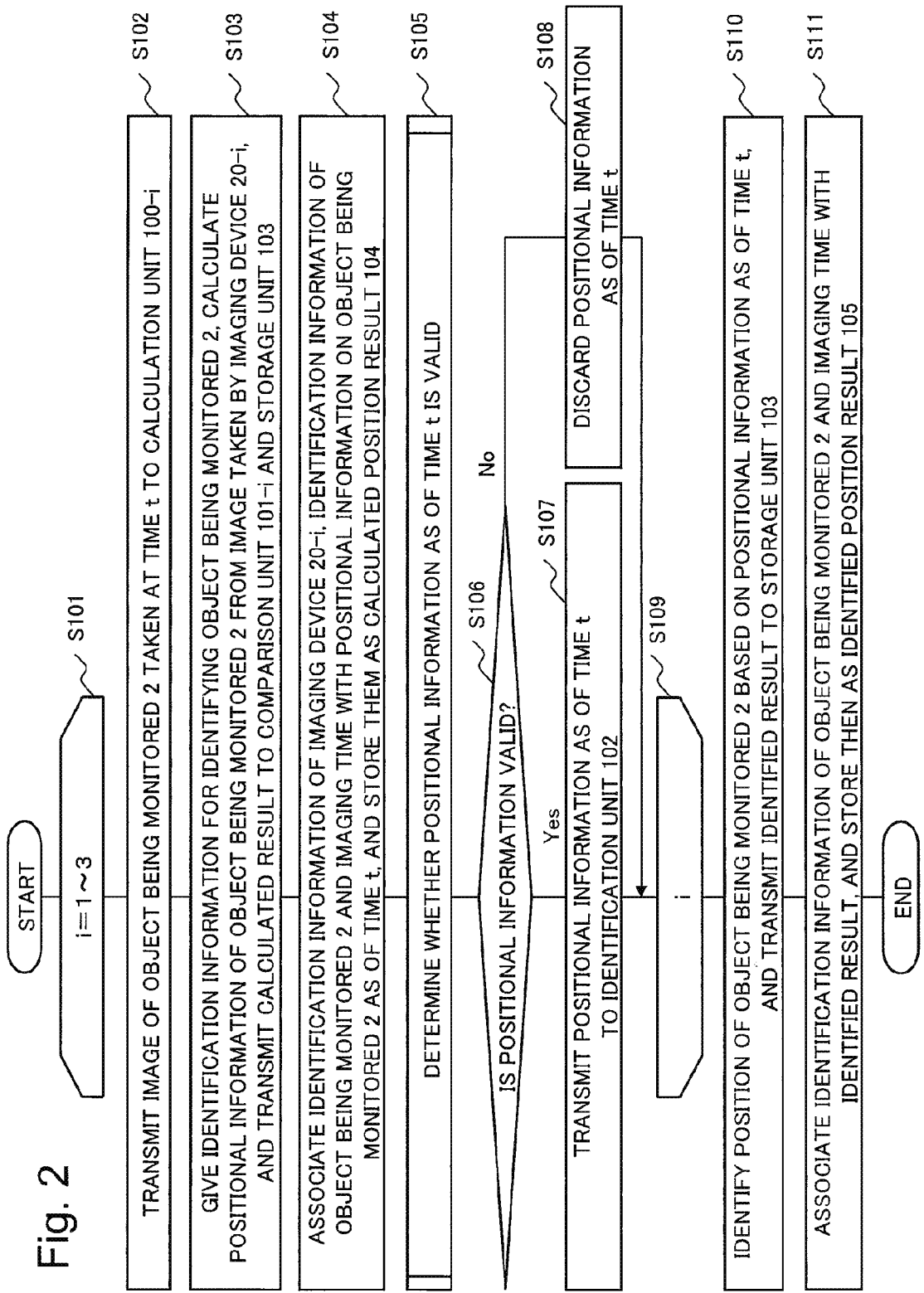
FIG. 2 is a flowchart representing overall operations according to the first exemplary embodiment of the present invention.
Figure 3:
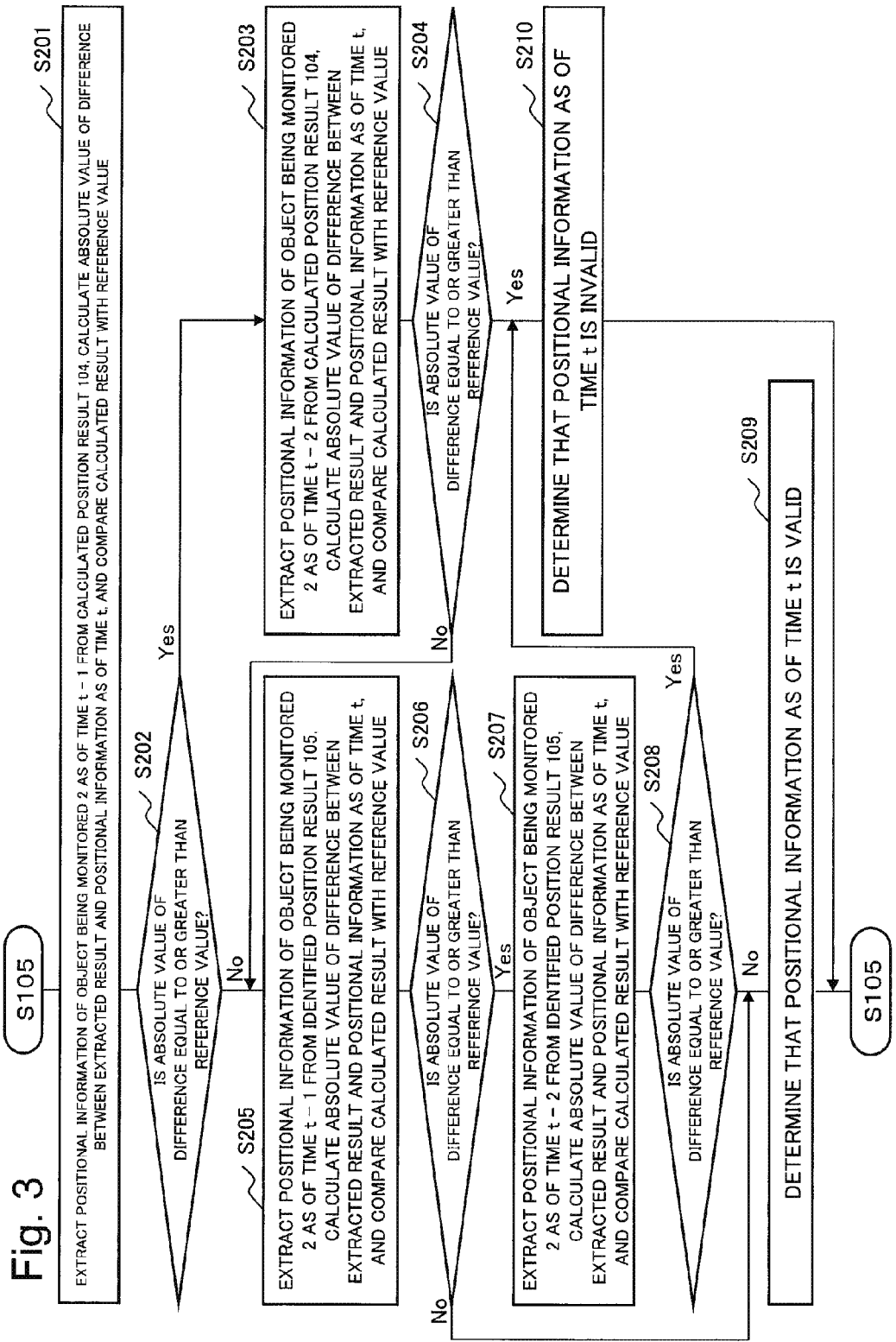
FIG. 3 is a flowchart representing operations of validity determination in a comparison unit according to the first exemplary embodiment of the present invention.

Operations according to this exemplary embodiment will now be described in detail with reference to flowcharts in FIGS. 2 and 3.

The position management system 1 sets a loop operation between S101 and S109, where i=1 to 3 (S101). The imaging device 20-$i$ transmits an image of the object being monitored 2 taken at a time t to the calculation unit 100-$i$ (S102). The calculation unit 100-$i$ gives identification information for identifying the object being monitored 2, and calculates the positional information of the object 2 from the image taken by the imaging device 20-$i$. The calculation unit 100-$i$ transmits the calculated result to the comparison unit 101-$i$ and the storage unit 103 (S103). The storage unit 103 associates identification information for identifying the imaging device 20-$i$, identification information for identifying the object being monitored 2 and an imaging time with the positional information of the object being monitored 2 as of the time t received from the calculation unit 100-$i$, and stores these associated items as a calculated position result 104 (S104). The comparison unit 101-$i$ determines whether the positional information as of the time t received from the calculation unit 100-$i$ is valid or not (S105).

Explanation is now provided below following the flowchart in FIG. 3.

The comparison unit 101-$i$ extracts the positional information of the object being monitored 2 as of a time (t−1) from the calculated position result 104 in the storage unit 103. The comparison unit 101-$i$ calculates the absolute value of the difference between the extracted positional information and the positional information as of the time t received from the calculation unit 100-$i$, and makes a comparison with a reference value (S201). If the absolute value of the difference is equal to or greater than the reference value (Yes in S202), the processing branches to S203. If the absolute value of the difference is less than the reference value (No in S202), the processing branches to S205. The comparison unit 101-$i$ extracts the positional information of the object being monitored 2 as of a time (t−2) from the calculated position result 104 in the storage unit 103. The comparison unit 101-$i$ calculates the absolute value of the difference between the extracted positional information and the positional information as of the time t received from the calculation unit 100-$i$, and makes a comparison with a reference value (S203). If the absolute value of the difference is equal to or greater than the reference value (Yes in S204), the processing branches to S210. If the absolute value of the difference is less than the reference value (No in S204), the processing branches to S205.

The comparison unit 101-$i$ extracts the positional information of the object being monitored 2 as of a time (t−1) identified by the identification unit 102 from the identified position result 105 in the storage unit 103. The comparison unit 101-$i$ calculates the absolute value of the difference between the extracted positional information and the positional information as of the time t received from the calculation unit 100-$i$, and makes a comparison with a reference value (S205). If the absolute value of the difference is equal to or greater than the reference value (Yes in S206), the processing branches to S207. If the absolute value of the difference is less than the reference value (No in S206), the processing branches to S209. The comparison unit 101-$i$ extracts the positional information of the object being monitored 2 as of a time (t−2) identified by the identification unit 102 from the identified position result 105 in the storage unit 103. The comparison unit 101-*i* calculates the absolute value of the difference between the extracted positional information and the positional information as of the time t received from the calculation unit 100-*i*, and makes a comparison with a reference value (S207).

If the absolute value of the difference is equal to or greater than the reference value (Yes in S208), the processing branches to S210. If the absolute value of the difference is less than the reference value (No in S208), the processing branches to S209. The comparison unit 101-*i* determines that the positional information as of the time t received from the calculation unit 100-*i* is valid (S209), and then the processing returns to S105. The comparison unit 101-*i* determines that the positional information as of the time t received from the calculation unit 100-*i* is invalid (S210), and then the processing returns to S105.

Explanation is now provided below following the flowchart back in FIG. 2.

If the positional information is valid (Yes in S106), the processing branches to S107. If the positional information is invalid (No in S106), the processing branches to S108. The comparison unit 101-*i* transmits the positional information as of the time t to the identification unit 102 (S107). The comparison unit 101-*i* discards the positional information as of the time t (S108). After completion of every loop operation from S101 for i=1 to 3, the processing goes to S110 (S109).

Based on the positional information as of the time t received from the comparison units 101-1 to 101-3, the identification unit 102 identifies the position of the object being monitored 2, and then transmits the identified result to the storage unit 103 (S110). The storage unit 103 associates identification information for identifying the object being monitored 2 and an imaging time with the identified result received from the identification unit 102, and stores these associated items as an identified position result 105 (S111), and then the whole processing is finished.

This exemplary embodiment has the effect of calculating, with high precision, the positional information on an object being monitored from images taken by a plurality of imaging devices. This is because the comparison unit 101-*i* makes a comparison with the difference between the positional information of the object being monitored calculated from images taken by individual imaging devices and the positional information in the calculated position result 104 as well as in the identified position result 105, and if the comparison result does not meet predetermined criteria, the comparison unit discards the positional information calculated from the image taken by the applicable imaging device.

If any defect is contained in an image taken by any of the plurality of imaging devices, there will be a large error of positional information of the object being monitored calculated from that image. Thus, if the identification unit 102 uses the positional information with such large error, the identified position result about the object being monitored will be significantly less accurate.

For example, if the object being monitored is a person walking, it is improbable that he/she moves at high speed; his/her moving distance per unit time has an upper limit. Suppose that the upper limit is exceeded by a moving distance of an object being monitored that is calculated from the positional information of the object being monitored calculated from the image taken by a certain imaging device. In this case, it is highly probable that the image taken by the imaging device contains a defect, causing the calculation unit to calculate the positional information erroneously.

In this exemplary embodiment, the storage unit 103 stores positional information on an object being monitored as of every cyclic time, calculated from images taken by a plurality of imaging devices. In addition, the comparison unit 101-*i* discards any defective positional information based on a difference between the positional information as of the current time and the positional information as of a time one or two cycles prior to the current time, as well as on an upper limit of a moving distance described above. This enables the identification unit 102 to identify the position of an object being monitored with high precision.

In addition, in this exemplary embodiment, the comparison unit 101-*i* references not only the calculated position result 104 but also the identified position result 105 for performing the above-described comparison. In some cases, the calculated position result 104 may possibly contain less precise positional information. Thus, additional reference to the identified position result 105 by the comparison unit 101 enables to further improve the accuracy of the identified position result identified by the identification unit 102.

Second Exemplary Embodiment

A second exemplary embodiment of the present invention will now be explained in detail with reference to the drawings.

Figure 7:
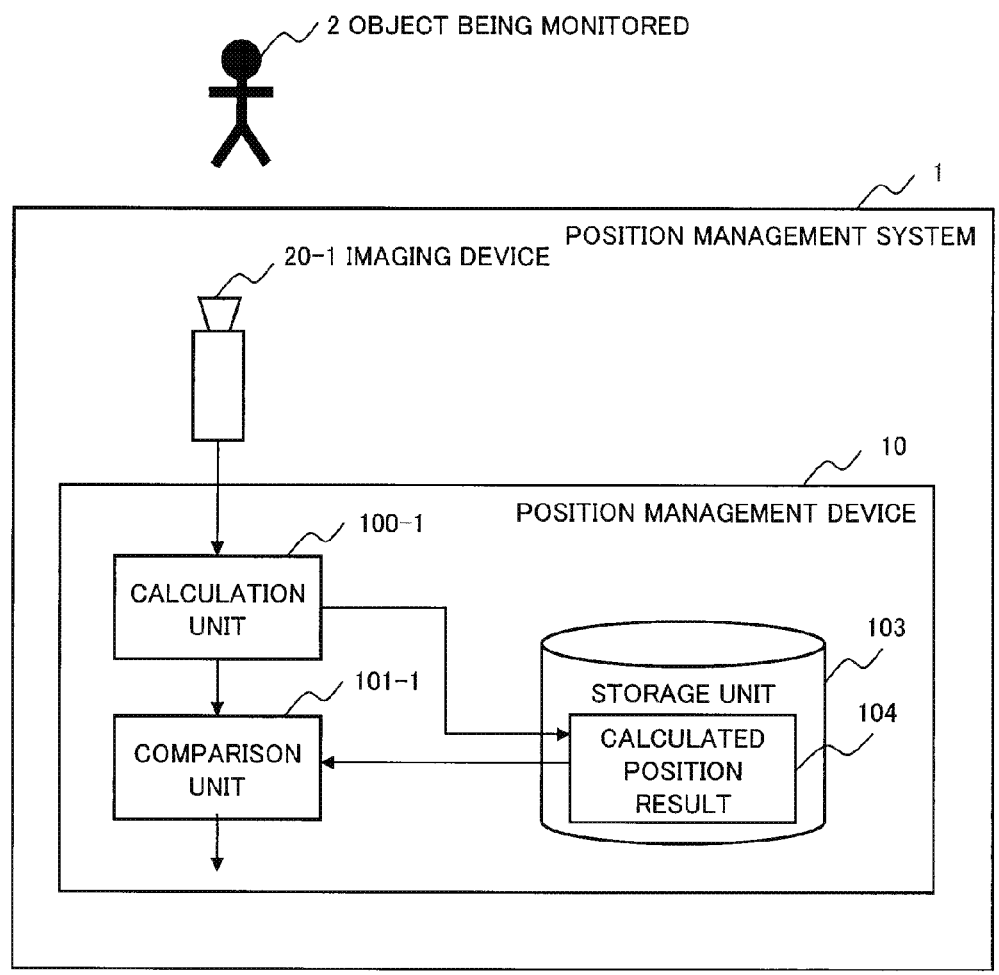
FIG. 7 is a block diagram illustrating a configuration of a position management system according to a second exemplary embodiment of the present invention.

FIG. 7 is a block diagram illustrating a configuration of a position management system relevant to the second exemplary embodiment of the present invention.

A position management system 1 includes a position management device 10 and an imaging device 20-1. The position management device 10 includes a calculation unit 100-1, a comparison unit 101-1, and a storage unit 103. The calculation unit 100-1 gives identification information for identifying an object being monitored to the object being monitored 2 whose images were cyclically taken by the imaging device 20-1, and calculates the positional information of the object being monitored 2 from the taken images of the object being monitored 2. The storage unit 103 associates identification information for identifying the object being monitored 2 and an imaging time with the above-described positional information, and stores these associated items as a calculated position result 104.

With respect to the object being monitored 2, the comparison unit 101-1 compares an absolute value of a difference between the positional information value as of the current time and the positional information value as of each of imaging times one cycle and two cycles prior to the current time, as stored in the storage unit 103, with a predetermined reference value. The comparison unit 101-1 then outputs the positional information as of the current time if the absolute value of the difference for at least one of the above-described imaging times is less than the reference value.

On the data extracted from the calculated position result 104, the comparison unit 101-1 calculates the absolute values of differences from the x and y coordinates as of the time t extracted from the imaging device 20-1, and then makes comparisons with reference values α and β. Individual validity determination operations performed by the comparison unit 101-1 with respect to the positional information of the object being monitored 2 are the same as in the first exemplary embodiment.

Figure 8:
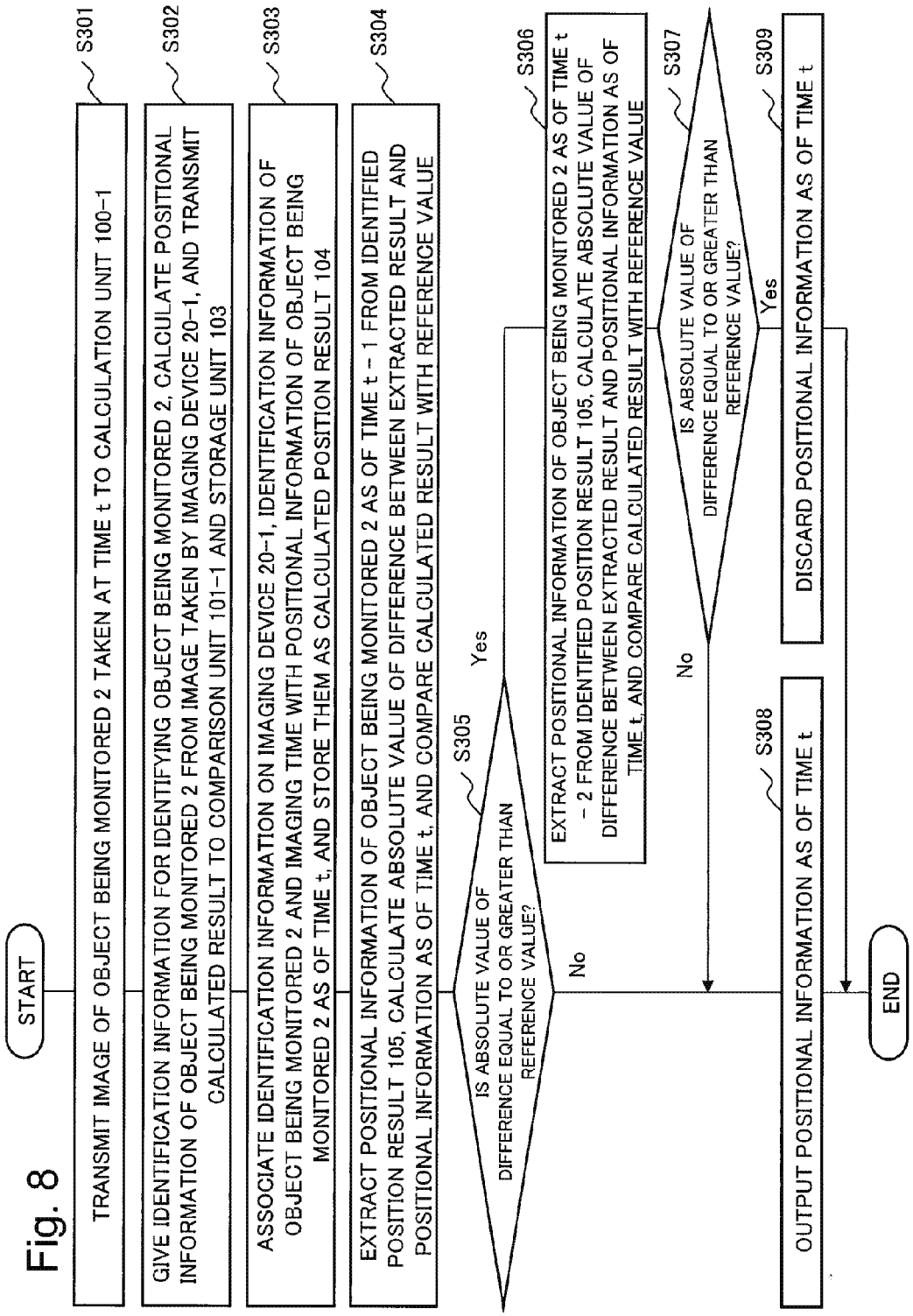
FIG. 8 is a flowchart representing operations according to the second exemplary embodiment of the present invention.

Operations according to this exemplary embodiment will now be described in detail with reference to the flowchart in FIG. 8.

The imaging device 20-1 transmits an image of the object being monitored 2 taken at a time t to the calculation unit 100-1 (S301). The calculation unit 100-1 gives identification information for identifying the object being monitored 2, calculates the positional information of the object 2 from the image taken by the imaging device 20-1, and then transmits the calculated result to the comparison unit 101-1 and the storage unit 103 (S302). The storage unit 103 associates identification information for identifying the imaging device 20-1, identification information for identifying the object being monitored 2 and an imaging time with the positional information of the object being monitored 2 as of the time t received from the calculation unit 100-1, and stores these associated items as a calculated position result 104 (S303). The comparison unit 101-1 extracts the positional information of the object being monitored 2 as of a time (t−1) from the calculated position result 104 in the storage unit 103. The comparison unit 101-1 calculates the absolute value of the difference between the extracted positional information and the positional information as of the time t received from the calculation unit 100-1, and makes a comparison with a reference value (S304).

If the absolute value of the difference is equal to or greater than the reference value (Yes in S305), the processing branches to S306. If the absolute value of the difference is less than the reference value (No in S305), the processing branches to S308. The comparison unit 101-1 extracts the positional information of the object being monitored 2 as of a time (t−2) from the calculated position result 104 in the storage unit 103. The comparison unit 101-1 calculates the absolute value of the difference between the extracted positional information and the positional information as of the time t received from the calculation unit 100-1, and makes a comparison with a reference value (S306). If the absolute value of the difference is equal to or greater than the reference value (Yes in S307), the comparison unit 101-1 discards the positional information as of the time t (S309), and then the whole processing is finished. If the absolute value of the difference is less than the reference value (No in S307), the comparison unit 101-1 outputs the positional information as of the time t (S308), and then the whole processing is finished.

This exemplary embodiment has the effect of calculating, with high precision, the positional information on an object being monitored from images taken by an imaging device. This is because the comparison unit 101-1 makes a comparison with the difference between the positional information of the object being monitored calculated from an image taken by the imaging device and the positional information in the calculated position result 104, and if the comparison result does not meet predetermined criteria, the comparison unit discards the positional information calculated from the image taken by the imaging device.

The positional information which is output by the comparison unit 101-1 will be used, for example, for identifying the positional information of the object being monitored, as in the first exemplary embodiment. Thus, the comparison unit 101-1 enables to avoid decreasing accuracy in identification of a position by discarding any positional information having a large error.

<Example of Hardware Configuration>

In the above exemplary embodiments, each unit illustrated in FIGS. 1 and 7 can be regarded as a function (processing) unit (software module) of a software program. However, the individual unit separations illustrated in these figures represent a configuration for explanatory convenience only, and a variety of configurations can be envisaged for implementation. One example of a hardware environment in such cases is explained below with reference to FIG. 9.

Figure 9:
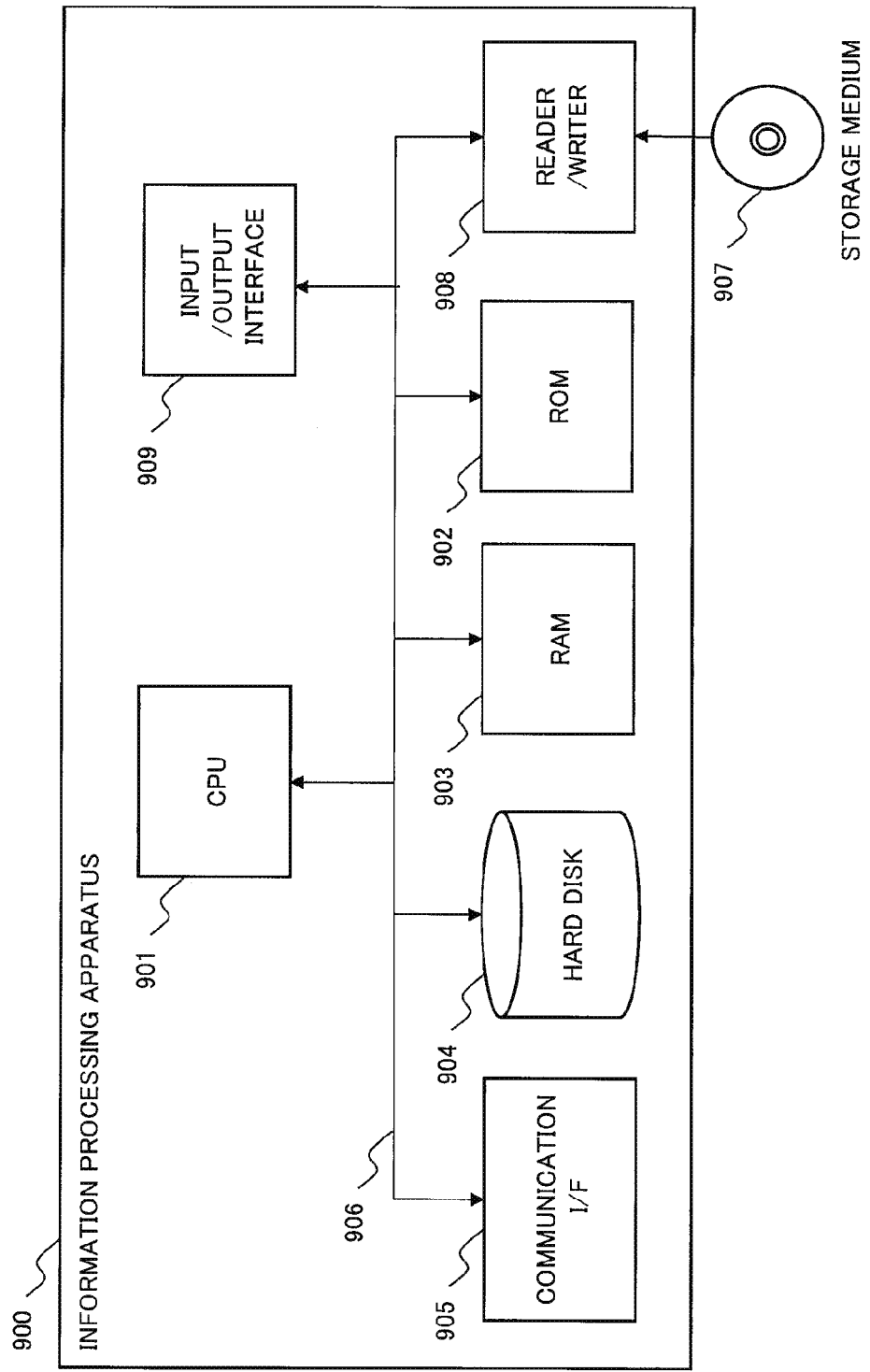
FIG. 9 is a block diagram illustrating a configuration of an information processing apparatus which is capable of implementing position management devices according to the first and second exemplary embodiments of the present invention.

FIG. 9 illustrates, by way of example, a configuration of an information processing apparatus 900 (computer) which can implement a position management device relevant to an exemplary embodiment of the present invention. In other words, FIG. 9 illustrates a configuration of a computer (information processing apparatus) capable of implementing the information processing devices illustrated in FIGS. 1 and 7, representing a hardware environment where the individual functions in the above-described exemplary embodiments can be implemented.

The information processing apparatus 900 illustrated in FIG. 9 includes the following as components:
CPU 901 (Central_Processing_Unit);
ROM 902 (Read_Only_Memory);
RAM 903 (Random_Access_Memory);
Hard disk 904 (storage device);
Communication interface to an external device 905 (Interface: hereinafter called "I/F");
Reader/writer 908 capable of reading and writing data stored in a storage medium 907 such as CD-ROM (Compact_Disc_Read_Only_ Memory); and
Input/output interface 909.

The information processing apparatus 900 is a general computer where these components are connected via a bus 906 (communication line).

The present invention explained with the above-described exemplary embodiments as examples is accomplished by providing the information processing apparatus 900 illustrated in FIG. 9 with a computer program which is capable of implementing the functions illustrated in the block diagrams (FIGS. 1 and 7) or the flowcharts (FIGS. 2, 3, and 8) referenced in the explanation of these embodiments, and then by reading the computer program into the CPU 901 in such hardware, interpreting it, and executing it. The computer program provided to the apparatus can be stored in a volatile readable and writable storage memory (RAM 903) or in a nonvolatile storage device such as the hard disk 904.

In addition, in the case described above, general procedures can now be used to provide the computer program to such hardware. These procedures include, for example, installing the computer program into the apparatus via any of various storage media 907 such as CD-ROM, or downloading it from an external source via communication lines such as the Internet. In these cases, the present invention can be seen as being composed of codes forming such computer program or being composed of the storage medium 907 storing the codes.

The present invention has been explained above with the above-described embodiments as exemplary examples. However, the present invention is not limited to the above-described exemplary embodiments. In other words, various aspects of the present invention that could be understood by those skilled in the art may be applied within the scope of the present invention.

This application claims priority based on Japanese Patent Application No. 2012-148404 filed on Jul. 2, 2012, the entire disclosure of which is herein incorporated.

REFERENCE SIGNS LIST

1 Position management system
2 Object being monitored
10 Position management device
100-1 to 100-3 Calculation unit
101-1 to 101-3 Comparison unit
102 Identification unit 103 Storage unit
104 Calculated position result
105 Identified position result
106 Determination result list
20-1 to 20-3 Imaging device
900 Information processing apparatus
901 CPU
902 ROM
903 RAM
904 Hard disk
905 Communication interface
906 Bus
907 Storage medium
908 Reader/writer
909 Input/output interface

What is claimed is:

1. A position management device, comprising:
a calculation unit that gives identification information of an object being monitored to the object being monitored cyclically imaged by an imaging device, and calculates positional information of the object being monitored from an image of the imaged object being monitored;
a storage unit that associates the identification information of the object being monitored and an imaging time with the positional information, and stores the identification information, the imaging time and the positional information, which are associated with each other; and
a comparison unit that compares, with respect to the object being monitored, an absolute value of a difference between a value of the positional information as of a current time and a value of the positional information as of each of the imaging times one cycle and two cycles prior to the current time, which are stored in the storage unit, with a predetermined reference value, and outputs the positional information as of the current time even if the absolute value of the difference for the imaging time one cycle prior to the current time is equal to or greater than the reference value, and if the absolute value of the difference for the imaging time two cycles prior to the current time is less than the reference value.

2. The position management device according to claim 1, further comprising:
a plurality of the calculation units that individually input the images taken by a plurality of the imaging devices;
a plurality of the comparison units that individually input sets of the positional information calculated by a plurality of the calculation units; and
an identification unit that combines sets of the positional information being output by a plurality of the comparison units and outputs identified positional information identifying the position of the object being monitored,
wherein the storage unit associates the identification information of the object being monitored and the imaging time with the identified positional information, and stores the identification information, the imaging time and the identified positional information, which are associated with each other,
and wherein the comparison unit compares, with respect to the object being monitored, an absolute value of a difference between a value of the positional information as of a current time and a value of the identified positional information as of each of the imaging times one cycle and two cycles prior to the current time, which are stored in the storage unit, with a predetermined reference value, and outputs the positional information as of the current time even if the absolute value of the difference for the imaging time one cycle prior to the current time is equal to or greater than the reference value, and if the absolute value of the difference for the imaging time two cycles prior to the current time is less than the reference value.

3. A position management system comprising the position management device according to claim 1 and the imaging device.

4. A position management method, comprising:
by an information processing apparatus, giving identification information on an object being monitored to the object being monitored cyclically imaged by an imaging device, and calculating positional information on the object being monitored from an image of the imaged object being monitored;
by the information processing apparatus, associating with the identification information of the object being monitored and an imaging time with the positional information, and storing the identification information, the imaging time and the positional information, which are associated with each other, in a storage area; and
by the information processing apparatus, comparing, with respect to the object being monitored, an absolute value of a difference between a value of the positional information as of a current time and a value of the positional information as of each of the imaging times one cycle and two cycles prior to the current time, as stored in the storage area, with a predetermined reference value, and outputting the positional information as of the current time if the absolute value of the difference for at least one of the imaging times is less than the reference value.

5. The position management method according to claim 4, comprising:
individually inputting the images taken by a plurality of the imaging devices;
individually inputting sets of the positional information calculated from the images taken by a plurality of the imaging devices;
combining a plurality of sets of the positional information and outputting identified positional information identifying the position of the object being monitored;
associating the identification information of the object being monitored and the imaging time with the identified positional information, and storing the identification information, the imaging time and the identified positional information, which are associated with each other, in the storage area; and
comparing, with respect to the object being monitored, an absolute value of a difference between a value of the positional information as of a current time and a value of the identified positional information as of each of the imaging times one cycle and two cycles prior to the current time, as stored in the storage area, with a predetermined reference value, and outputting the positional information as of the current time even if the absolute value of the difference for the imaging time one cycle prior to the current time is equal to or greater than the reference value, and if the absolute value of the difference for the imaging time two cycles prior to the current time is less than the reference value.

6. A non-transitory computer readable storage medium storing a position management program, causing a computer to execute:
a calculation processing of giving identification information on an object being monitored to the object being monitored cyclically imaged by an imaging device, and calculating positional information of the object being monitored from an image of the imaged object being monitored;

a storage processing of associating the identification information of the object being monitored and an imaging time with the positional information, and storing the identification information, the imaging time and the positional information, which are associated with each other, in a storage area; and a comparison processing of, with respect to the object being monitored, comparing an absolute value of a difference between a value of the positional information as of a current time and a value of the positional information as of each of the imaging times one cycle and two cycles prior to the current time, as stored in the storage area, with a predetermined reference value, and outputting the positional information as of the current time even if the absolute value of the difference for the imaging time one cycle prior to the current time is equal to or greater than the reference value, and if the absolute value of the difference for the imaging time two cycles prior to the current time is less than the reference value.

7. The non-transitory computer readable storage medium storing the position management program according to claim 6, causing a computer to execute:

a plurality of the calculation processing of individually inputting the images taken by a plurality of the imaging devices;

a plurality of the comparison processing of individually inputting sets of the positional information calculated by a plurality of the calculation processing; and an identification processing of combining sets of the positional information being output by a plurality of the comparison processing and outputting identified positional information identifying the position of the object being monitored, wherein the storage processing associates the identification information of the object being monitored and the imaging time with the identified positional information, and stores the identification information, the imaging time and the identified positional information, which are associated with each other, in the storage area, and wherein the comparison processing compares, with respect to the object being monitored, an absolute value of a difference between a value of the positional information as of a current time and a value of the identified positional information as of each of the imaging times one cycle and two cycles prior to the current time, as stored in the storage area, with a predetermined reference value, and outputs the positional information as of the current time even if the absolute value of the difference for the imaging time one cycle prior to the current time is equal to or greater than the reference value, and if the absolute value of the difference for the imaging time two cycles prior to the current time is less than the reference value.

* * * * *